United States Patent
Finnie et al.

(10) Patent No.: US 7,991,962 B2
(45) Date of Patent: Aug. 2, 2011

(54) SYSTEM AND METHOD OF USING THREADS AND THREAD-LOCAL STORAGE

(75) Inventors: Liam James Finnie, Toronto (CA); Lan Pham, Markham (CA); Matthew Albert Huras, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 11/953,480

(22) Filed: Dec. 10, 2007

(65) Prior Publication Data

US 2009/0150616 A1    Jun. 11, 2009

(51) Int. Cl.
G06F 12/00    (2006.01)
(52) U.S. Cl. .. 711/132; 711/170; 711/173; 711/E12.001
(58) Field of Classification Search .................. None
See application file for complete search history.

(56) References Cited

U.S. PATENT DOCUMENTS

| | | | |
|---|---|---|---|
| 5,247,674 A * | 9/1993 | Kogure | 711/170 |
| 5,511,192 A * | 4/1996 | Shirakihara | 718/106 |
| 6,006,323 A | 12/1999 | Ma et al. | |
| 6,463,582 B1 * | 10/2002 | Lethin et al. | 717/158 |
| 6,886,085 B1 * | 4/2005 | Shuf et al. | 711/159 |
| 7,124,251 B2 | 10/2006 | Clark et al. | |
| 7,139,865 B2 | 11/2006 | Urard | |
| 7,162,586 B2 | 1/2007 | Chauvel et al. | |
| 7,380,245 B1 * | 5/2008 | Lovette | 711/152 |
| 2002/0016878 A1 * | 2/2002 | Flores | 710/200 |
| 2002/0116505 A1 * | 8/2002 | Higgins et al. | 709/227 |
| 2003/0177328 A1 * | 9/2003 | Naganuma et al. | 711/170 |
| 2004/0230762 A1 * | 11/2004 | Allen et al. | 711/170 |
| 2005/0086658 A1 * | 4/2005 | Wilding et al. | 718/104 |
| 2008/0016305 A1 * | 1/2008 | Chen et al. | 711/163 |

OTHER PUBLICATIONS

Hawblitzel, Christopher K. "Adding Operating System Structure to Language-Based Protection," Cornell University, 2000, 141 pages.

* cited by examiner

Primary Examiner — Michael C Krofcheck
(74) Attorney, Agent, or Firm — Toler Law Group

(57) ABSTRACT

A system is provided that includes processing logic and a memory management module. The memory management module is configured to allocate a portion of memory space for a thread stack unit and to partition the thread stack unit to include a stack and a thread-local storage region. The stack is associated with a thread that is executable by the processing logic and the thread-local storage region is adapted to store data associated with the thread. The portion of memory space allocated for the thread stack unit is based on a size of the thread-local storage region that is determined when the thread is generated and a size of the stack.

20 Claims, 5 Drawing Sheets

US 7,991,962 B2

SYSTEM AND METHOD OF USING THREADS AND THREAD-LOCAL STORAGE

I. FIELD

The present disclosure is generally related to systems and methods related to usage of threads and thread local storage.

II. BACKGROUND

A computer operating system may initiate a software application by creating a number of processes or tasks to execute instructions associated with the application. The application may create one or more threads, such as application-level threads and/or operating system threads, to implement a particular process. Computer systems that rely primarily on a multi-threaded architecture rather than on individual processes can improve performance and simplify configuration and administration. However, building and using complex computer systems to manage a very large number of threads and associated thread-local storage can be difficult. For example, systems that utilize thread-local storage typically require special hardware and compiler technology to perform efficiently. Additionally, implementing a multi-threaded architecture that is suitable for use by a variety of different operating systems can be challenging. Accordingly, there is a need for an improved system and method of using threads and thread-local storage.

III. SUMMARY

A system is provided that includes processing logic and a memory management module. The memory management module is configured to allocate a portion of memory space for a thread stack unit, to partition the thread stack unit to include a stack and a thread-local storage region, and optionally to include an alternate stack and one or more guard pages. The stack is associated with a thread that is executable by the processing logic and the thread-local storage region is adapted to store data associated with the thread. The portion of memory space allocated for the thread stack unit is based on a size of the thread-local storage region that is determined when the thread is generated and is based on a size of the stack. The portion of memory space allocated for the thread stack unit may also be based on a size of one or more optional guard pages and a size of an optional alternate stack.

In another embodiment, a computer memory is disclosed that includes a first thread stack unit. The first thread stack unit includes a first stack associated with a first thread, where the first thread is executable by processing logic. The first thread stack unit also includes a first thread-local storage region adapted to store data associated with the first thread. The first thread stack unit may also include an optional alternate stack and one or more optional guard pages. Further, the computer memory includes a second thread stack unit.

In another embodiment, a method of using threads and thread-local storage is disclosed that includes allocating a region of a computer memory to include a plurality of thread stack units. Each of the plurality of thread stack units includes a stack associated with a computer executable thread and a thread-local storage region adapted to store data associated with the computer executable thread. Additionally, each of the plurality of thread stack units may optionally include one or more guard pages and an alternate stack. The method also includes executing a first computer executable thread using a respective thread stack unit and adding the respective thread stack unit to a data structure after the first computer executable thread has been executed. The data structure includes a plurality of available thread stack units. Further, the method includes generating a second computer executable thread and assigning at least one of the plurality of available thread stack units to the second computer executable thread.

IV. BRIEF DESCRIPTION OF THE DRAWINGS

V. DETAILED DESCRIPTION

Figure 1:
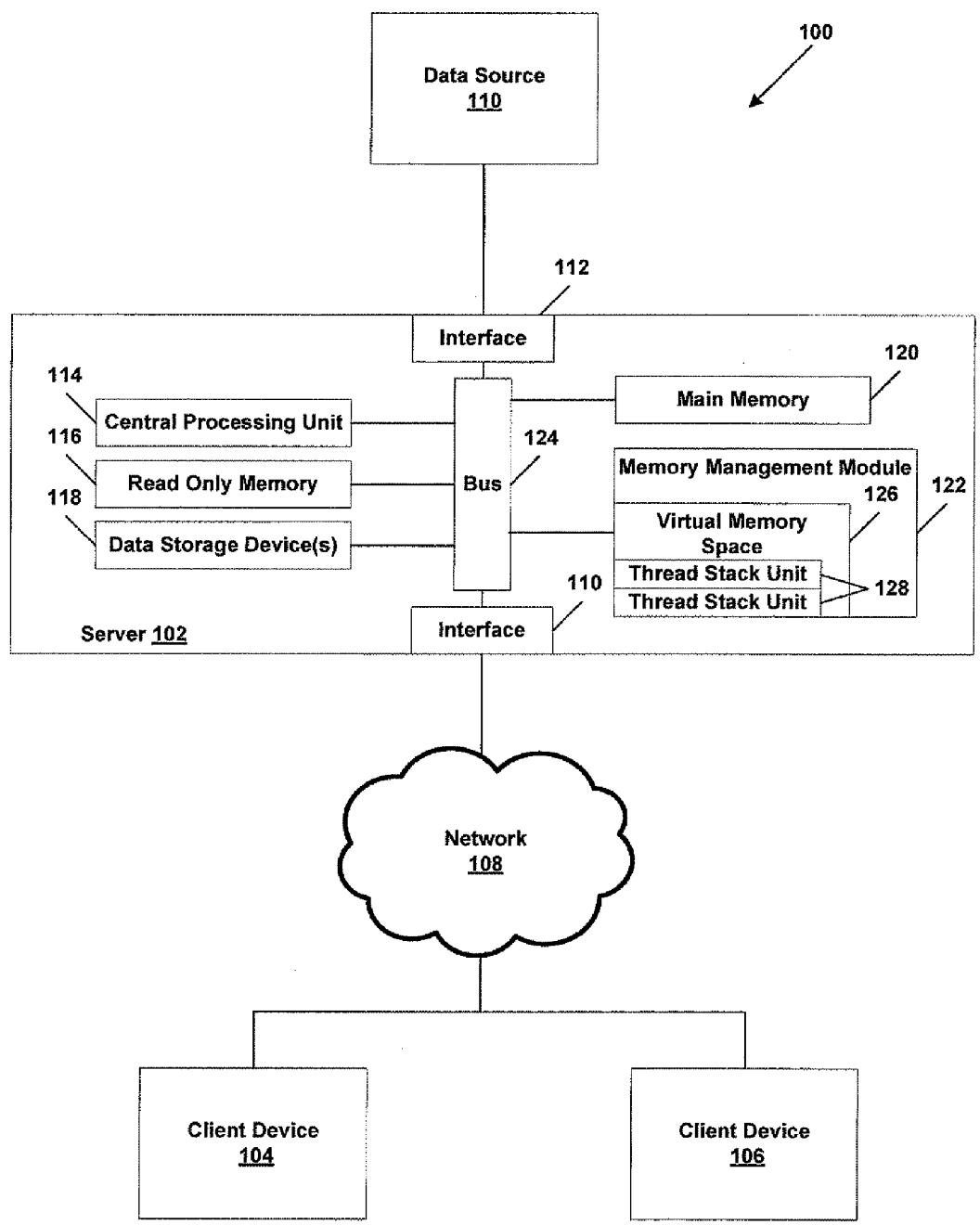
FIG. 1 is a diagram of a particular embodiment of a system that uses threads and thread-local storage.

FIG. 1 is a diagram of a particular embodiment of a system 100 that utilizes threads and thread-local storage. The system 100 includes a server 102 that is adapted to communicate with client devices, such as a first representative client device 104 and a second representative client device 106, via a network 108. The client devices 104, 106 may include a personal computing device, a server, or a mobile computing device, such as a hand-held computing device, a mobile phone, or a laptop computer. In an illustrative embodiment, the client device 104, the client device 106, or any combination thereof may be located within the server 102. The network 108 may include a local area network, a wide area network, an Internet Protocol network, a wireless network, a wireline network, or any combination thereof. The server 102 is also adapted to communicate with a data source 110 coupled to the server 102. The server 102 may communicate with the data source 110 via a local area network, a wide area network, an Internet Protocol network, a wireless network, a wireline network, or any combination thereof. In an illustrative, non-limiting embodiment, the data source 110 may include one or more databases stored on one or more data storage devices. Although FIG. 1 illustrates the representative client devices 104, 106, any number of client devices may communicate with the server 102 via the network 108.

The server 102 includes an interface 110 to communicate with the network 108 and an interface 112 to communicate with the data source 110. The interfaces 110, 112 may include one or more connections, where each connection is dedicated to a particular client device 104, 106 or to a particular component of the data source 110. The server 102 also includes processing logic such as a central processing unit (CPU) 114, a read-only memory (ROM) 116, and one or more data storage devices 118, such as one or more hard disk drives. Additionally, the server 102 includes a main memory 120, such as a random access memory (RAM), and a memory management module 122. The server 102 also includes a bus 124 that controls communication between the CPU 114, the ROM 116, the one or more data storage devices 118, the main memory 120, the memory management module 122, and the interfaces 110, 112.

In an illustrative embodiment, the memory management module 122 is adapted to produce a virtual memory space 126. Further, the memory management module 122 is adapted to partition the virtual memory space 126 into a number of thread stack units 128. The thread stack units 128 may include one or more stacks that are associated with a thread executed by the CPU 114. Each thread stack unit 128 may also include guard pages, alignment space, a thread-local storage region, alternate stacks, or any combination thereof associated with the particular thread of a respective thread stack unit 128. In an illustrative, non-limiting embodiment, a particular thread stack unit 128 associated with a portion of the virtual memory space 126 may be mapped to corresponding regions of a physical memory device, such as the main memory 120, and translated by the CPU 114 into associated regions of the physical memory device upon execution of the thread corresponding to the particular thread stack unit 128. Further, the portions of the virtual memory space 126 associated with the thread stack units 128 may be mapped to contiguous portions of the physical memory device.

In an illustrative embodiment, the server 102 receives a request from a client device, such as the client device 104, related to accessing information stored at the data source 110. In order to access the requested information, the server 102 may execute a number of processes, with each process including or initiating one or more processing threads. The processes may be associated with a particular application or a number of applications. After receiving the information request from the client device 104, the memory management module 122 may be adapted to allocate a region in virtual memory, such as the virtual memory space 126, for one or more threads that are executable to provide a response to the information request. The memory management module 122 may generate one or more thread stack units, such as the thread stack units 128, and execute one or more functions associated with each thread using the generated thread stack units to fulfill the information request received from the client device 104.

Figure 2:
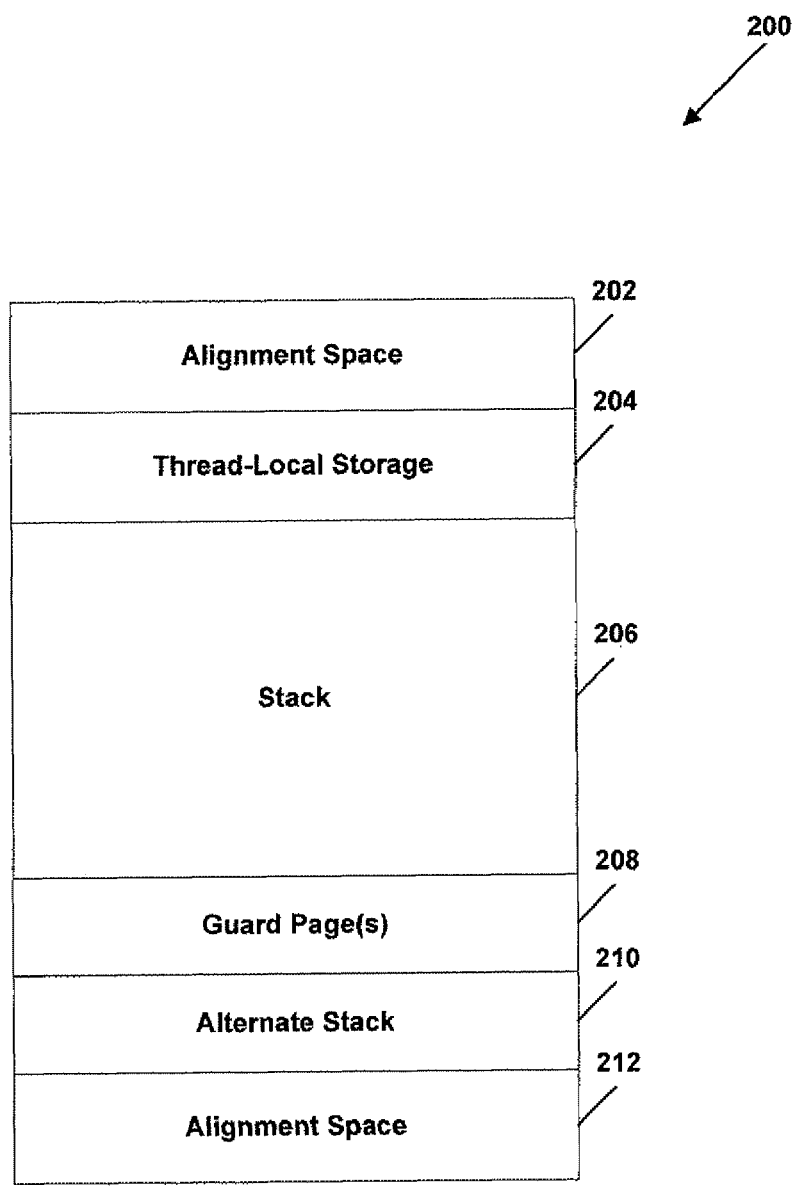
FIG. 2 is a diagram of a particular embodiment of a thread stack unit.

FIG. 2 is a diagram of a particular embodiment of a thread stack unit 200. The tread stack unit 200 may be one of the thread stack units 128 shown in FIG. 1. The thread stack unit 200 includes a primary stack 206 that is adapted to be used to execute a thread associated with a particular process of an application. Further, the thread stack unit 200 includes a thread-local storage region 204 and optionally includes one or more guard pages 208 and an alternate stack 210. The thread-local storage region 204 may be located at another location within the thread stack unit 200 instead of at the top of the thread stack unit 200 as shown in FIG. 2. For example, the thread-local storage region 204 may be located adjacent to the optional alternate stack 210 at the bottom of the thread stack unit 200. The one or more optional guard pages 208 may be adapted to detect stack overflows from the primary stack 206. Additionally, the alternate stack 210 may be utilized when an error condition occurs, such as stack corruption or hitting one of the guard pages 208, and any code executed by the thread using the alternate stack 210 can retrieve data from the thread-local storage region 204.

The thread stack unit 200 includes a first alignment space 202 and a second alignment space 212. The size of the alignment spaces 202, 212 are selected to insure that the size of the thread stack unit 200 is a power of 2. For example, if the thread stack unit 200 includes the thread-local storage region 204, the stack 206, one or more guard pages 208, and the alternate stack 210, having a size of 4 MB, the combination of the alignment spaces 202, 212 may be 194,304 bytes so that the total size of the thread stack unit 200 is 4,194,304 bytes (i.e. $2^{22}$).

Figure 3:
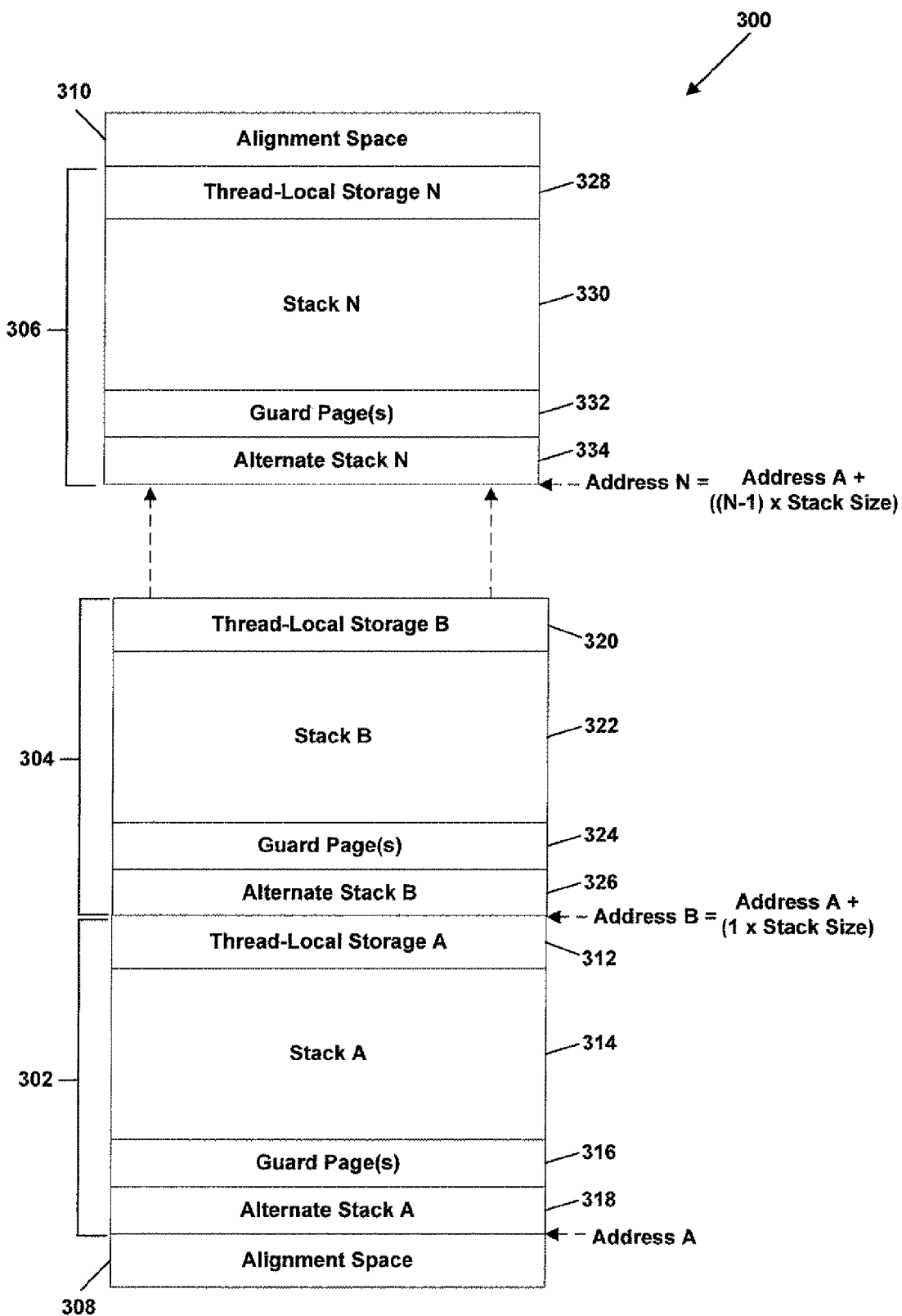
FIG. 3 is a diagram of a particular embodiment that illustrates an arrangement of a plurality of thread stack units.

Referring to FIG. 3, a diagram of a particular embodiment of an arrangement of a plurality of thread stack units is illustrated and designated generally 300. The plurality of thread stack units 300 includes a first representative thread stack unit 302, that is adjacent to a second representative tread stack unit 304, and a third representative thread stack unit 306. Although, the plurality of thread stack units 300 shown in FIG. 3 includes three thread stack units, the plurality of thread stack units 300 may include any number N of thread stack units, where N is a positive integer that is greater than zero. For example, there may be any number of thread stack units between the thread stack unit 304 and the thread stack unit 306. The plurality of thread stack units 300 is bounded by a first alignment space 308 and a second alignment space 310. Additionally, each thread stack unit 302, 304, 306 may be associated with a particular thread. In an illustrative, non-limiting embodiment, the threads associated with the thread stack units 302, 304, 306 may be associated with the same process or a different process. When the threads associated with the thread stack units 302, 304, 306 are associated with one or more different processes, each process should have the virtual address range of the associated thread stack units mapped, so that data may be shared among the different processes.

The first thread stack unit 302 includes a primary stack A 314 and a first thread-local storage A 312. In an illustrative embodiment, the first thread stack unit 302 may optionally include one or more guard pages 316 and an alternate stack A 318. The thread stack unit 302 is assigned a first Address A. In an illustrative embodiment, the first Address A is a power of 2 and is based on the size of the thread stack unit 302.

The second thread stack unit 304 includes a second primary stack B 322 and a second thread-local storage B 320. In an illustrative embodiment, the second thread stack unit 304 may optionally include one or more guard pages 324 and an alternate stack B 326. The second thread stack unit 304 is assigned a second Address B. In an illustrative embodiment, the second Address B is a power of 2 and equals the first Address A plus the size of the first thread stack unit 302

The third or $N^{th}$ thread stack unit 306 includes a stack N 330 and an $N^{th}$ thread-local storage N 328. In an illustrative embodiment, the $N^{th}$ thread stack unit 306 may optionally include one or more guard pages 332 and an alternate stack N 334. The $N^{th}$ thread stack unit 306 is assigned an Address N. In an example where each of the thread stack units of the plurality of thread stack units 300 is the same size, the Address N is a power of 2 and equals the first Address A plus (N−1) times the size of a thread stack unit. In another example where the size of the thread stack units of the plurality of thread stack units varies, the Address N is a power of 2 and equals the first Address A plus the sum of the sizes of each thread stack unit that is located between the thread stack unit 302 and the thread stack unit 306.

In an illustrative embodiment, each thread stack unit is aligned on a power-of-2 based virtual address, and each thread stack unit has a size equal to its alignment requirements. For example, a 4 MB-sized thread stack unit requires a 4 MB-aligned virtual address. When each thread stack unit has special alignment requirements, the thread stack unit is more efficiently allocated when many thread stack units are allocated at a time because the cost of alignment is pro-rated across all of the number of thread stack units allocated at that time. To illustrate, by combining a number of thread stack units, such as thread stack units 302, 304, 306, alignment space is added to the top of the first stack unit and to the bottom of the last stack unit, as opposed to adding alignment space to the top and bottom of each separate thread stack unit.

In a particular embodiment, the size of the thread-local storage regions 314, 320, and 328 may be fixed at the time of compilation of an application associated with a particular thread related to the stack 302, 304, or 306 or may be fixed at initialization of the application. The disclosed system provides an efficient thread-local storage mechanism, since all thread stack units are appropriately aligned (i.e. they start on a virtual address range that is some multiple of the thread stack unit size, which in itself is some power-of-2 based value). For example, to obtain a location of a thread-local storage region for a particular thread stack unit, an address that is available on the stack (for instance, the address of a variable on the stack), can be used with some simple pointer arithmetic to allow the system to efficiently determine the location of the thread-local storage region in a few machine instructions.

In another embodiment, the size of the thread-local storage regions 312, 320, and 328 may be variable and may differ for each thread associated with the respective stacks 302, 304, 306. For example, the size of a particular thread-local storage region 312, 320, 328 may be programmed dynamically during execution of the thread associated with the particular thread-local storage region 312, 320, 328. In an illustrative embodiment, determining the location of thread local storage regions having a variable size may include storing the size of a thread-local storage region related to a particular thread at the top of the thread stack unit and using the size of the thread-local storage region to determine the top of the stack frame. The top of the stack frame may be adjusted as needed. Alternatively, the exact address of a thread-local storage region may be calculated for a particular thread when the thread is first created and the calculated address may be stored at the top of the stack frame.

Figure 4:
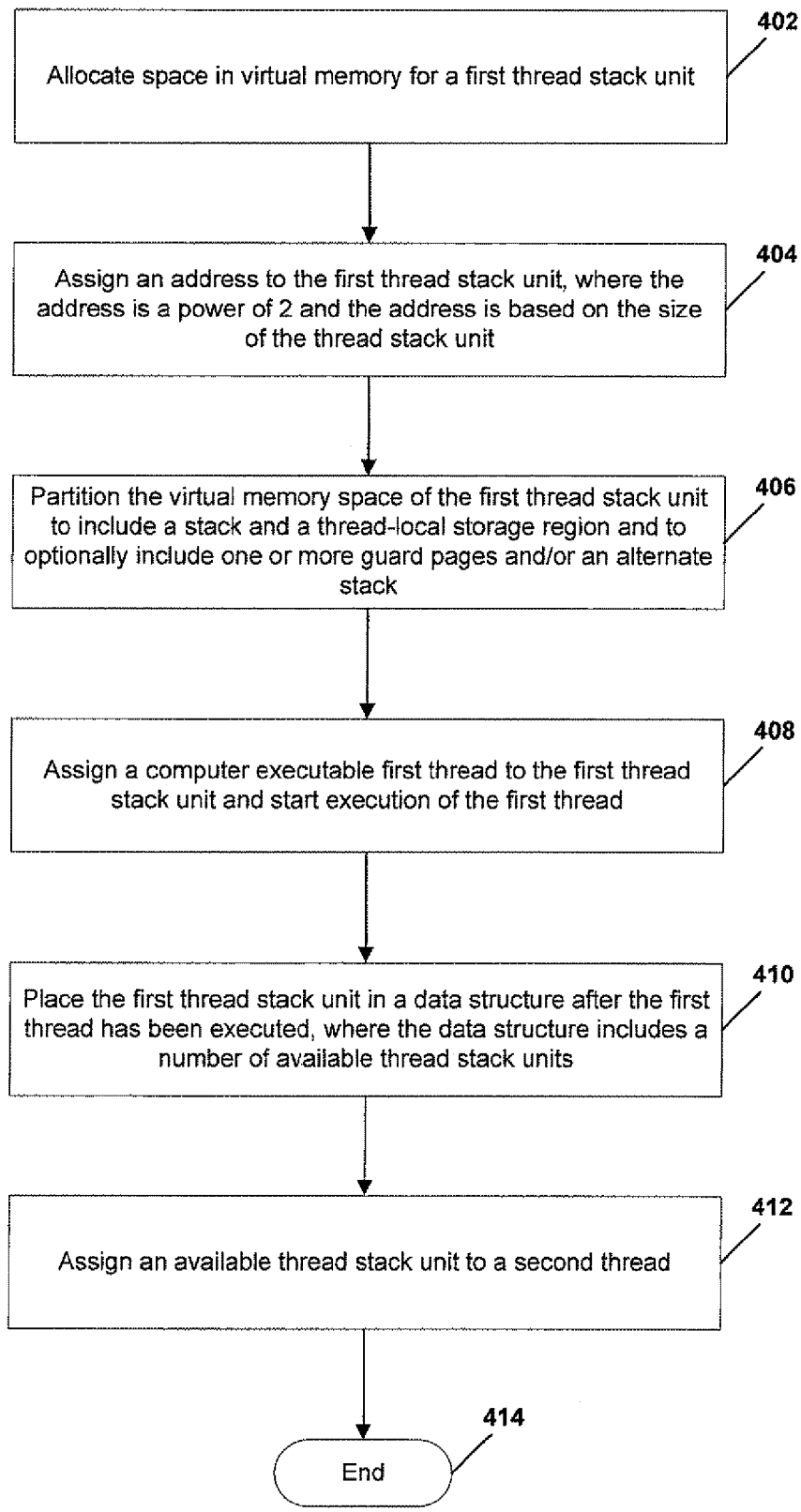
FIG. 4 is a flow diagram of a particular embodiment of a method of using threads and thread-local storage.

FIG. 4 is a flow diagram of a particular embodiment of a method of using threads and thread stack units, such as the thread stack units shown in FIGS. 1-3. At 402, space is allocated in virtual memory for a first thread stack unit. Moving to 404, an address is assigned to the first thread stack unit. In a particular embodiment, the address is a power of 2 and the address is based on the size of the thread stack unit. Proceeding to 406, the virtual memory space of the first thread stack unit is partitioned to include a stack and a thread-local storage region. The first thread stack unit may include an optional one or more guard pages and an optional alternate stack that may be used when certain error conditions occur.

At 408, a computer executable first thread is assigned to the first thread stack unit and the first thread is executed. Moving to 410, the thread stack unit is placed in a data structure after the first thread has been executed. The data structure includes a number of available thread stack units. Proceeding to 412, an available thread stack unit from the number of available thread stack units is assigned to a second thread. The method terminates at 414. Thus, a particular thread stack unit can be created to be used, such that after a respective thread terminates, the particular thread stack unit can be re-used. The disclosed system keeps track of the thread stack units that are available for re-use by placing thread stack units into a data structure after the thread corresponding to a particular thread stack unit has been executed. When new threads are created, an available thread stack unit included in the data structure of available thread stack units may be selected to execute the new thread. The disclosed method can increase thread-creation performance, since the memory for each thread stack unit is pre-allocated. The disclosed method is helpful in cases where there are many threads being created and destroyed.

Figure 5:
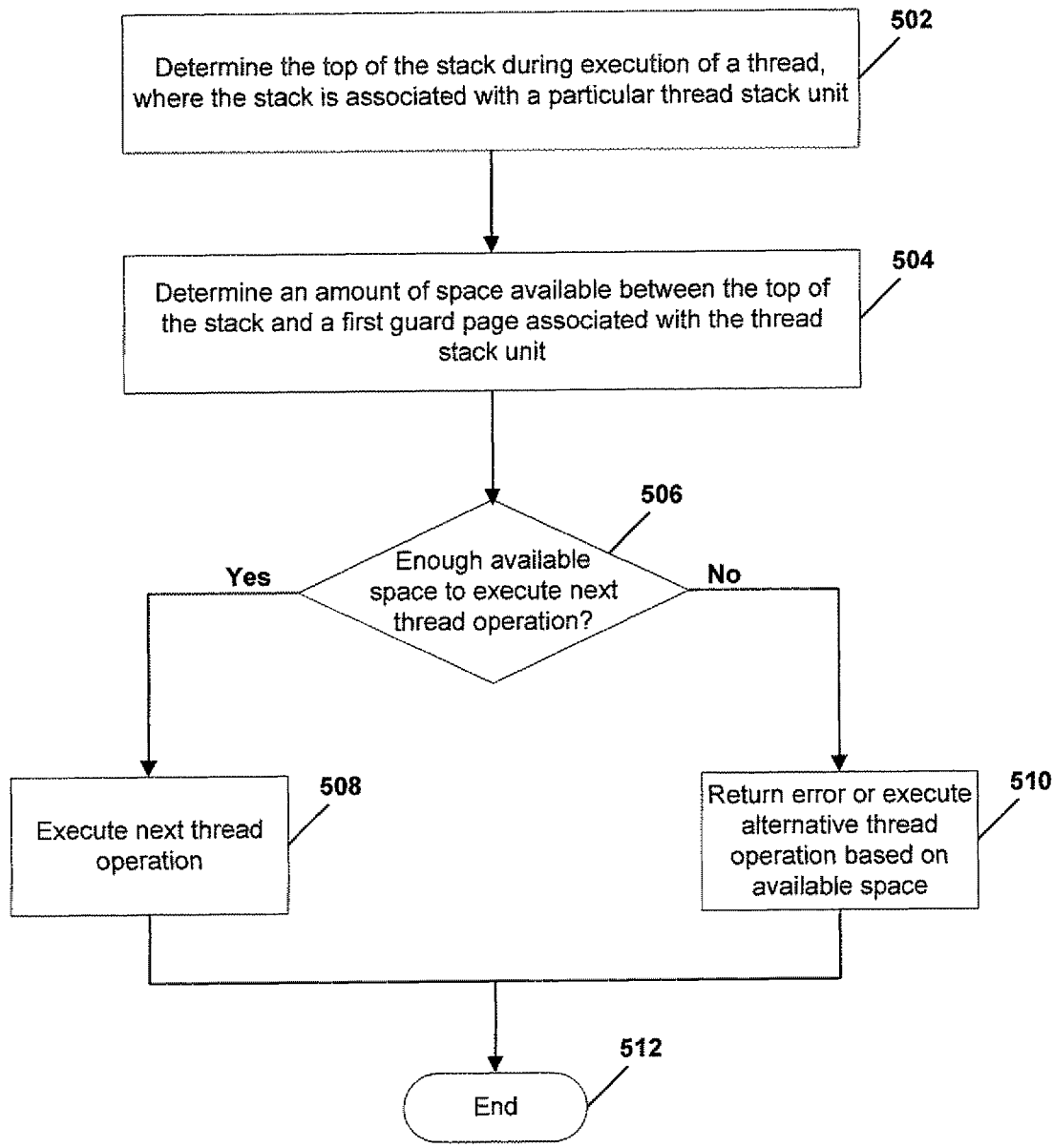
FIG. 5 is a flow diagram of a second particular embodiment of a method of using threads and thread-local storage.

FIG. 5 is a flow diagram of a second particular embodiment of a method of using threads and thread-local storage. At 502, a top of a stack is determined during execution of a thread, where the stack is associated with a particular thread stack unit. Moving to 504, an amount of available space is determined between the top of the stack and a first guard page associated with the thread stack unit.

Proceeding to decision block 506, it is determined whether there is enough space available to execute the next thread operation. If there is enough space available, the method proceeds to 508. At 508, the next thread operation is executed. If there is not enough space available, the method proceeds to 510 and an error is returned or an alternative thread operation is executed based on the amount of available space. The method terminates at 512.

Particular embodiments can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and features as defined by the following claims.

What is claimed is:

1. A system, comprising:
 processing logic; and
 a memory management module configured to:
  allocate a plurality of thread stack units in a portion of memory space, wherein when the plurality of thread stack units have a particular alignment requirement the memory management module adds a first alignment space to a top of a first thread stack unit of the plurality of thread stack units and adds a second alignment space to a bottom of a last thread stack unit of the plurality of thread stack units;

partition a particular thread stack unit of the plurality of thread stack units to include a stack and a thread-local storage region, the thread-local storage region located adjacent to an alternate stack that is located at a bottom of the particular thread stack unit, wherein the alternate stack is used when an error condition occurs, and wherein the error condition comprises at least one of a stack corruption error and a guard page error; and associate the stack with a thread that is executable by the processing logic, the thread-local storage region adapted to store data associated with the thread, wherein the portion of memory space allocated for the particular thread stack unit is based on a size of the thread-local storage region that is determined when the thread is generated and based on a size of the stack.

2. The system of claim 1, wherein the memory management module is configured to partition the particular thread stack unit to include the alternate stack and one or more guard pages, and wherein the portion of memory space allocated for the particular thread stack unit is based on a size of the one or more guard pages and a size of the alternate stack.

3. The system of claim 2, wherein the memory management module is configured to map a portion of a main memory to the particular thread stack unit, such that the stack, the guard page, the thread-local storage region, and the alternate stack are mapped to a contiguous portion of the main memory.

4. The system of claim 1, wherein the particular thread stack unit has a size that is a power of two.

5. The system of claim 4, wherein the particular thread stack unit is aligned on a power of two based virtual address.

6. A computer memory, comprising:

a plurality of thread stack units including a first thread stack unit and a second thread stack unit, wherein when the plurality of thread stack units have a particular alignment requirement, a first alignment space is added to a top of the first thread stack unit of the plurality of stack units and a second alignment space is added to a bottom of a last thread stack unit of the plurality of stack units, the first thread stack unit including:

a first stack associated with a first thread, wherein the first thread is executable by processing logic; and a first thread-local storage region adapted to store data associated with the first thread, the first thread-local storage region located adjacent to a first alternate stack that is located at a bottom of the first thread stack unit, wherein the first alternate stack is used when an error condition occurs, and wherein the error condition comprises at least one of a stack corruption error and a guard page error.

7. The computer memory of claim 6, wherein the second thread stack unit includes a second stack associated with a second thread executable by the processing logic and a second thread-local storage region adapted to store data associated with the second thread.

8. The computer memory of claim 7, wherein the first thread stack unit includes the first alternate stack and one or more first guard pages and the second thread stack unit includes a second alternate stack and one or more second guard pages.

9. The computer memory of claim 7, wherein the first thread and the second thread are associated with the same process.

10. The computer memory of claim 6, wherein the first thread stack unit is adjacent to the second thread stack unit within a contiguous portion of the computer memory.

11. The computer memory of claim 10, wherein the contiguous portion of the computer memory including the first thread stack unit and the second thread stack unit includes alignment space, and wherein a size of the contiguous portion of the computer memory is a power of two.

12. A method, comprising:

allocating a region of a computer memory to include a plurality of thread stack units, each of the plurality of thread stack units including a stack associated with a computer executable thread and including a thread-local storage region adapted to store data associated with the computer executable thread, the thread-local storage region located adjacent to an alternate stack that is located at a bottom of each of the plurality of thread stack units, wherein the alternate stack is used when an error condition occurs, wherein the error condition comprises at least one of a stack corruption error and a guard page error, and wherein when the plurality of thread stack units have a particular alignment requirement, a first alignment space is added to a top of a first thread stack unit of the plurality of stack units and a second alignment space is added to a bottom of a last thread stack unit of the plurality of stack units;

executing a first computer executable thread using the first thread stack unit of the plurality of thread stack units, the first thread stack unit associated with the first computer executable thread;

adding the first thread stack unit to a data structure after the first computer executable thread has been executed, the data structure including one or more thread stack units of the plurality of thread stack units that are available;

generating a second computer executable thread; and assigning at least one thread stack unit of the available thread stack units to the second computer executable thread.

13. The method of claim 12, wherein the second computer executable thread uses the at least one thread stack unit in connection with a stack operation and wherein the computer memory includes a combination of virtual memory and physical memory.

14. The method of claim 12, wherein executing the first computer executable thread using the first thread stack unit includes performing a first stack operation and a second stack operation.

15. The method of claim 14, further comprising determining an amount of stack space remaining in the first thread stack unit after the first stack operation and performing an alternative stack operation instead of the second stack operation when there is not enough stack space available to perform the second stack operation.

16. The method of claim 12, wherein an amount of the computer memory allocated to a particular thread-local storage region is variable, wherein a pointer to the particular thread-local storage region is determined when a particular thread stack unit is allocated, and wherein the pointer is stored at the top of the particular thread stack unit that is associated with the particular thread-local storage region.

17. The method of claim 12, wherein an amount of the computer memory allocated to a particular thread-local storage region is fixed and the amount of the computer memory allocated to the particular thread-local storage region is determined during compilation of an application related to the computer executable thread associated with the particular thread-local storage region.

18. The method of claim 12, wherein an amount of the computer memory allocated to a particular thread-local storage region is fixed and the amount of the computer memory allocated to the particular thread-local storage region is determined during initialization of an application related to the computer executable thread associated with the particular thread-local storage region.

19. The method of claim 12, wherein a position of a particular thread-local storage region within a particular thread stack unit is variable.

20. The method of claim 19, wherein the particular thread stack unit includes one or more guard pages and the alternate stack.

* * * * *